United States Patent [19]

Kato

[11] Patent Number: 4,565,433

[45] Date of Patent: Jan. 21, 1986

[54] VIEWFINDER FOR CAMERA

[75] Inventor: Masatake Kato, Tokyo, Japan

[73] Assignee: Canon Kabushiki Kaisha, Japan

[21] Appl. No.: 654,101

[22] Filed: Sep. 24, 1984

[30] Foreign Application Priority Data

Sep. 29, 1983 [JP] Japan .......................... 58-150804[U]

[51] Int. Cl.⁴ .......................... G03B 3/00; G03B 19/12
[52] U.S. Cl. ..................................... 354/201; 354/225
[58] Field of Search .............. 354/155, 224, 225, 200, 354/201; 352/140; 358/224

[56] References Cited

U.S. PATENT DOCUMENTS 3,232,197 2/1966 Kasahara .................... 354/225 X

FOREIGN PATENT DOCUMENTS 2458194 6/1975 Fed. Rep. of Germany ...... 354/225

Primary Examiner—John Gonzales
Attorney, Agent, or Firm—Toren, McGeady, Stanger, Goldberg & Kiel

[57] ABSTRACT

In the disclosed viewfinder for a camera, the light passing through the photographic lens is reflected an even number of times, focused on a first image plane at a position equivalent to a prescribed focal plane of the photographic lens, and then further reflected from the roof reflection surfaces of a roof type prism to pass through an eyepiece, thereby the image on the first image plane can be observed through the eyepiece.

7 Claims, 4 Drawing Figures

VIEWFINDER FOR CAMERA

BACKGROUND OF THE INVENTION

1. Field of the Invention

This invention relates to optical finder devices suitable for still cameras, electronic cameras and video cameras.

2. Description of the Prior Art

Two types of optical finders have been known, one is the simple or external type used in rangefinders and leaf shutter type cameras, and the other is the through-the-lens (TTL) type used in the single lens reflex cameras, 8 mm cameras and cine cameras. Although the construction of the latter is more complicated, it is superior in that there is no parallax between the fields of view of the photographic lens and the finder. Nowadays, most high grade cameras employ the TTL finder, and in video cameras where the output signals from the image pickup tube may be routed to form an image to be observed, the electronic viewfinder has been widely used. In this case the advantage is that it can be monitored, but the disadvantages are that distance measurement accuracy is lower due to poorer resolving power, the bulk and size are greater, and electrical power consumption is more than with the optical finder. Therefore, it is difficult to decide which of the optical and electronic finders is superior. Generally speaking, however, in either case, it is desirable to increase the brightness and image magnification of the finder image.

The optical finders of the TTL type may be classified into two types, one which has only one image plane as used in the single lens reflex camera and the other which has two image planes as used in the 8 mm camera or the cine camera.

FIG. 1 schematically illustrates a finder optical system of the single lens reflex camera which is a prior art example of the former or primary imaging type finder. There are shown a photographic lens 1, a quick return mirror 2, a film 3, a focusing screen 4, a condenser lens 5, a pentagonal roof type prism 6, an eyepiece 7 and an exit pupil 8. Light entering through the photographic lens 1 is reflected by the quick return mirror 2 to the focusing screen 4 in a position equivalent to that of the film plane 3 on which a first image is formed. Light from this image is reflected by a roof face "a" and a face "b" of the pentagonal roof type prism 6 to the eyepiece 7 through which the photographer observes that image. The condenser lens 5 is necessary for pupil adjustment.

In the finder of FIG. 1, image magnification depends on the focal length of the eyepiece 7, which is subject to restriction by the air reduced length of the optical path through the pentagonal roof type prism 6, as expanded. To increase image magnification, it is necessary only to shorten the focal length of the eyepiece 7. Actually, however, because the size of the prism 6 can not be reduced from the required value for the roof reflection face "a" to admit of all light from the focusing screen 4, it is difficult to achieve the desired decrease in the eyepiece 7 focal length. Furthermore, even when the focal length of the eyepiece 7 can be shortened, another problem is that the exit pupil 8 position cannot be taken at a sufficiently long distance.

FIG. 2 in a schematic view illustrates the prior art example of the secondary imaging type of optical finder used in the 8 mm camera or cine camera, wherein there are shown the photographic lens 1 with a zoom system 1' and a relay system 1", the film plane 3, a half prism 9, an objective lens 10, a first image plane 11, a total reflection mirror 12, an erector lens 13, a second image plane 14 and an eyepiece 15. An afocal light beam emerging from the zoom system 1' is partly deflected upward by the half prism 9 and then focused by the objective lens 10 to form an image on the first plane 11. This image is reflected by the mirror 12 and then re-focused by the erector lens 13 to form a second image on the plane 14, which is observed through the eyepiece 15. Meanwhile, the photographic light passes through the relay system 1" to form an image on the film plane 3.

The secondary imaging type finder, in comparison with the primary imaging type finder of FIG. 1, has an additional lens system (in the instance of FIG. 2, lens 13) between the first and second image planes 11 and 14, and, moreover, is able to shorten the focal length of the eyepiece without being limited by the pentagonal roof type prism 6. Therefore, angular magnification can be increased. But the complexity of the structure increases, the length of the body in the longitudinal direction increases and the space the finder occupies increases. For these reasons, this type finder is not suitable for use in the single lens reflex camera, which must be minimal in bulk and size.

An object of the present invention is to provide a primary imaging type TTL viewfinder.

Another or second object is to make it possible to shorten the focal length of the eyepiece to heighten image magnification.

A third object is to make the structure of the viewfinder simple and small.

SUMMARY OF THE INVENTION

To achieve these objects, according to the present invention, light entering through and emerging from the photographic lens 1 is reflected an even number of times, including that from a beam splitter, before it is focused on the first image plane 11 in a position equivalent to that of the prescribed focal plane of the photographic lens 1, and is then further reflected from the roof faces "a" and "b" of the roof type prism 6 to the eyepiece 7, 15 through which a finder image is observed.

DETAILED DESCRIPTION OF THE PREFERRED EMBODIMENT

Figure 1:
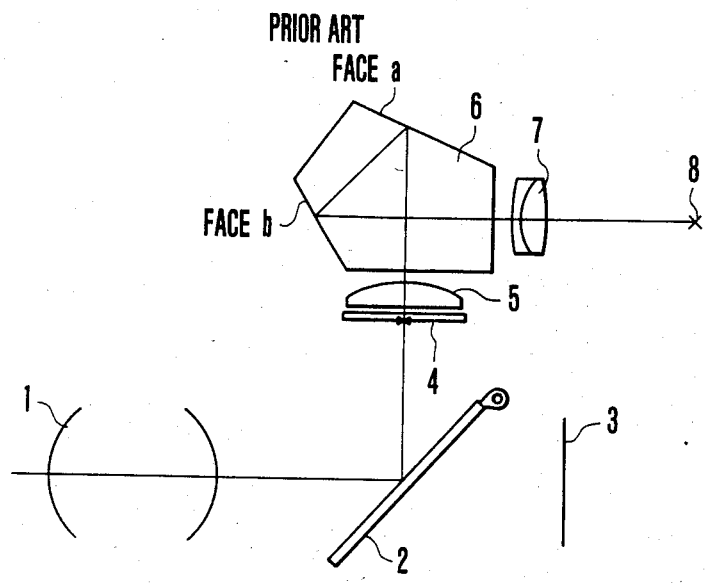
FIG. 1 is a longitudinal section view of the optical system of the prior known finder in a single lens reflex camera.
Figure 2:
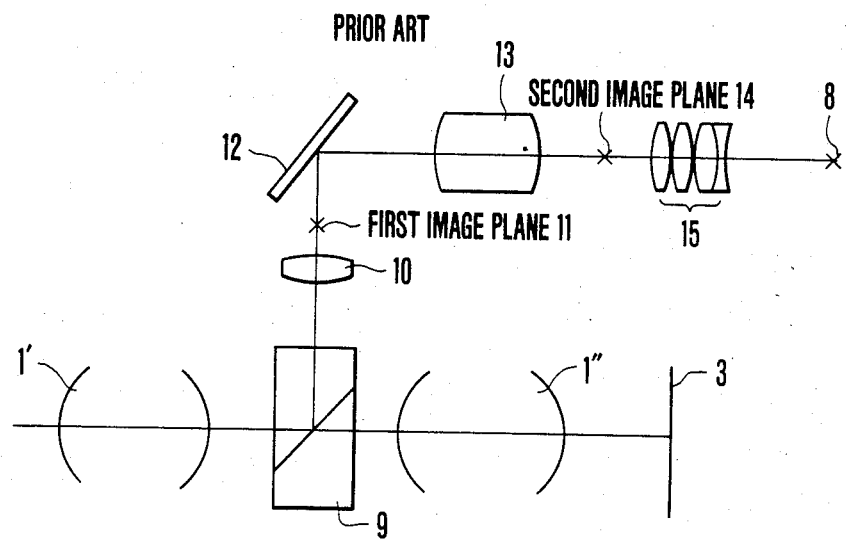
FIG. 2 is a longitudinal section view of the optical system of the prior known finder in the cine camera.

The present invention will next be described in detail in connection with an embodiment thereof by reference to FIG. 3 where 1 is the photographic lens; X is an optical axis of the photographic lens 1; 16 is a half prism; 17 is a half transparent surface in the half prism 16; 18 is a first image plane; 19 is a roof type prism; "a" and "a'" are its roof faces; 20 is an eyepiece; and 8 is the exit pupil. These parts constitute a finder optical system. The smallest angle which the normal line of the half transparent surface 17 makes with the optical axis X of the photographic lens 1, is 30°. Light entering through the photographic lens 1 is partly reflected by the half transparent surface 17 to a front face 16' on the side of the photographic lens 1 and is totally reflected to form an image on the primary image, plane 18. This image after being reflected from the roof faces "a" and "a'", passes through the eyepiece 20 to the pupil 8.

Figure 4:
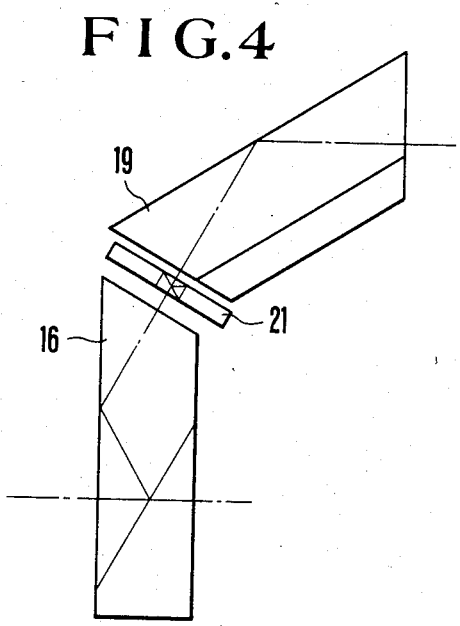
FIG. 4 is a fragmentary diagram similar to FIG. 3 except that a modification example is illustrated.

If the primary image plane 18 lies within the half prism 16, what is observed by the eyepiece 20 is an in-the-air image. Also, since the photographic lens 1 has a somewhat long back focal distance, it is possible to put the primary image plane 18 outside the half prism 16. A focusing screen 21 (see FIG. 4) may be adjacent to the exit face of the half prism 16 so that the primary image cast thereon is observed by the eyepiece 20.

In the construction and arrangement of the elements which have so far been described, the image on the primary image plane 18 is laterally reversed. In order for this image to be directly observed as a laterally erected image by the eyepiece 20, only one more reflection from the roof faces "a" and "a'" suffices. Meanwhile, until it reaches the primary image plane 18, the reflection occurs twice. After that, therefore, subjection to the reflection once from either of the roof faces suffices for also erecting the image in the vertical direction when it is observed by the eyepiece 20.

Thus, the necessary number of times reflection takes place between the primary image plane 18 and the eyepiece 20 is only one for each of the roof faces "a" and "a'". As compared with the prior known finder that necessitates the pentagonal roof type prism b, the air reduced length of the optical path can be shortened, permitting the focal length of the eyepiece 20 to be shortened. This makes it possible to increase image magnification.

The above-defined angle which the normal line of the half transparent surface 17 of the half prism 16 makes with the optical axis X of the photographic lens 1 is not confined to 30° and may take any value, providing that the required reflections in that part of the optical path of the finder which follows are obtained as the total reflection.

However, assuming that the smaller angle that the normal line of the half transparent surface 17 makes with the optical axis X of the photographic lens 1 is represented by $\theta$, the following condition is desired:

$$23° < \theta < 38°$$

The reason for the above condition is that when the half transparent surface 17 is turned up as the angle $\theta$ approaches the lower limit, the light reflected by the surface 17 is difficult to totally reflect with the half prism 16. It is the upper side of the light fluxes, having an angular aperture for a predetermined F-number, that is subjected to the most severe condition. In order to relax the condition for total reflection, there is a method of raising the refractive index of the material of the half prism 16. However, materials of a higher refractive index cause aberrations which are deteriorated. On the other hand, when the angle $\theta$ exceeds the upper limit, the half prism 16 must be extremely thick in order that all the photographic light flux may transmit the half transparent surface 17. This disadvantageously increases the size of the optical system. If the half prism 16 is not thickened, there is a difference in the quantity of light between the light flux transmitting the half transparent surface 17 and that transmitting the other part, and hence, uneven light quantity occurs on the image surface.

Figure 3:
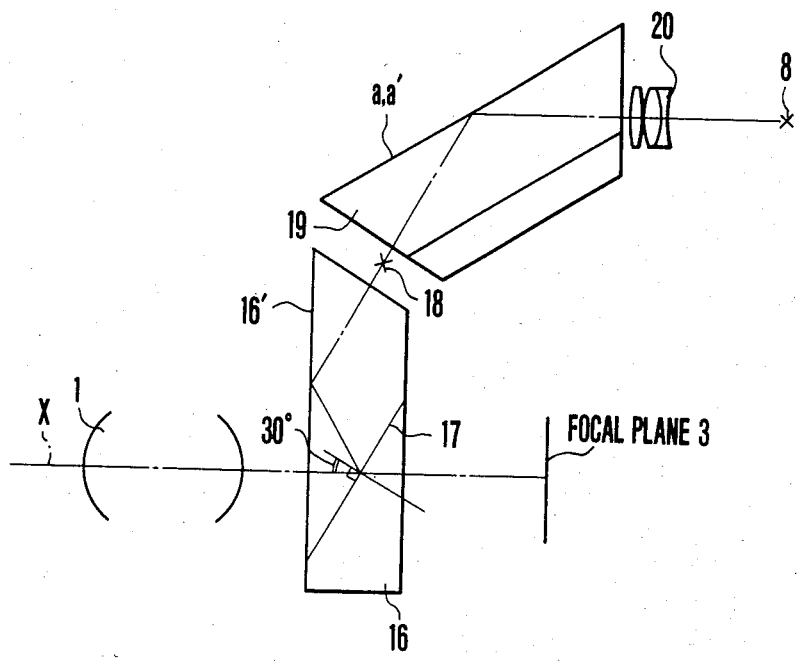
FIG. 3 is a schematic diagram showing an embodiment of the optics according to the present invention.

Furthermore, the number of times the light, after having passed through the photographic lens 1, reflects until it reaches the primary image plane 18 (or the number of reflection surfaces including that surface at which the photographic optical path and the finder optical path split away from each other, namely, in the instance of FIG. 3, the half transparent surface 17) is not confined to two but may be greater, providing that it is even. Also, a light beam emerging from the roof type prism 19 may be otherwise guided to the eyepiece 20 by using a plurality of mirrors while the image being observed is maintained and is not reversed in the horizontal and vertical directions.

It will be appreciated that according to the present invention, the air-reduced length of the optical path from the first image plane 18 to the eyepiece 20 becomes remarkably shorter than when the pentagonal roof type prism 6 is put between the first image plane 18 and the eyepiece 20, as in the prior known primary imaging type TTL finder. Thereby it is possible to obtain greater image magnification when the focal length of the eyepiece 20 is shortened, while still permitting a primary imaging TTL finder of minimal size and simple structure to be realized.

What is claimed is:
1. A viewfinder for a camera comprising:
   (a) a photographic lens having an optical path;
   (b) optical path splitting means for splitting said optical path on the image side of said photographic lens;
   (c) light conducting means for conducting light by an even number of times reflections including the reflection by said optical path splitting means;
   (d) light reflecting means receptive of the light emerged from said light conducting means and having roof type reflective surfaces, said light reflecting means having no crossing optical path; and
   (e) an eyepiece receptive of the light emerged from said light reflecting means, the light emerged from said photographic lens forming an image between said optical path splitting means and said light reflecting means.
2. A viewfinder according to claim 1, wherein said optical path splitting means is a half transparent mirror, and said light conducting means is a prism having said half transparent mirror and one reflective surface.
3. A viewfinder according to claim 2, wherein said reflective surface is a total reflection surface.
4. A viewfinder according to claim 2, wherein said light reflecting means has a roof type reflective surface and no other reflective surfaces.
5. A viewfinder according to claim 1, further comprising:
   a focusing screen positioned where said image is formed.
6. A viewfinder according to claim 1, wherein said optical path splitting means is a reflective surface with its normal line making substantially 30 degrees with an optical axis of said photographic lens.
7. A viewfinder according to claim 1, wherein said optical path splitting means is a prism having an oblique half transparent mirror, and the following condition is satisfied:

$$23+ < \theta < 38°$$

where $\theta$ represents the smaller one of angles that a normal line of said half transparent mirror makes with an optical axis of said photographic lens.

* * * * *